US006262880B1

(12) United States Patent
Fischer et al.

(10) Patent No.: US 6,262,880 B1

(45) Date of Patent: Jul. 17, 2001

(54) CIRCUIT BREAKER MOUNTING ASSEMBLY WITH MOVEABLE REMOTE TERMINAL BLOCK

(75) Inventors: Kenneth Martin Fischer, Finleyville; Kelly Julia McCarthy, Pittsburgh; Joseph Bell Humbert, Monaca, all of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/543,458

(22) Filed: Apr. 5, 2000

(51) Int. Cl.[7] .................................................... H02B 1/20

(52) U.S. Cl. ......................... 361/652; 361/823; 361/825; 361/826; 361/828; 361/644; 361/627; 248/49; 174/60

(58) Field of Search .................................... 361/627, 622, 361/628, 631, 641, 643, 823–828; 248/49; 174/60; 439/64

(56) References Cited

U.S. PATENT DOCUMENTS 3,780,351 * 12/1973 Salmon et al. ....................... 361/829
3,784,728 * 1/1974 De Bertoli et al. .................. 174/60
3,831,128 * 8/1974 Paluch ................................. 361/823
3,904,936 * 9/1975 Hamrick, Jr. et al. ............... 361/826
5,001,602 * 3/1991 Suffi et al. .......................... 361/724
5,313,372 * 5/1994 Chabert et al. ...................... 361/823
5,836,551 * 11/1998 Orlando ................................ 248/49

* cited by examiner

*Primary Examiner*—Leo P. Picard
*Assistant Examiner*—Boris L. Chervinsky
(74) *Attorney, Agent, or Firm*—Martin J. Moran

(57) ABSTRACT

A circuit breaker mounting assembly comprises an enclosure for holding at least one circuit breaker, with the circuit breaker being mounted within said enclosure; a terminal block mounted within the enclosure at a location remote from the circuit breaker, the terminal block including a plurality of input connections and a plurality of output connections; a plurality of control wires extending from the circuit breaker to the terminal block; and a mounting bracket for positioning the terminal block in a first position within the enclosure and for permitting the terminal block to be moved to a second location outside of the enclosure.

7 Claims, 8 Drawing Sheets

CIRCUIT BREAKER MOUNTING ASSEMBLY WITH MOVEABLE REMOTE TERMINAL BLOCK

CROSS REFERENCE TO A RELATED PATENT APPLICATION

A commonly assigned United States patent application titled "Circuit Breaker Mounting Assembly With Remote Terminal Block" filed on the same date as this application discloses a circuit breaker mounting assembly having an remote terminal block for connection to the auxiliary wiring of circuit breakers.

BACKGROUND OF THE INVENTION

This invention relates to circuit breaker mounting assemblies, and more particularly to such mounting assemblies having an auxiliary terminal block for connection to the auxiliary wiring of a circuit breaker.

Circuit breakers are generally used to protect electrical circuitry from damage due to an overcurrent condition, such as an overload fault or a relatively high level short circuit condition. Molded case circuit breakers, for example, include at least one pair of separable contacts which may be operated either manually by way of a handle disposed on the outside of the case or automatically in response to an overcurrent condition. In the automatic mode of operation, an electronic trip unit, for example, controls an operating mechanism that opens the separable contacts. In the manual mode of operation, the handle cooperates with the operating mechanism in order to open the separable contacts. Circuit breakers have at least one line terminal for connection to a power source and at least one load terminal for connection to a load, such as a motor. The separable contacts of the circuit breakers are internally connected to the line and load terminals. Circuit breakers may also have one or more auxiliary terminals. Such auxiliary terminals may be utilized as inputs to provide an external signal for tripping the circuit breaker. Furthermore, other such auxiliary terminals may be utilized as outputs to externally indicate the trip status of the circuit breaker. Input auxiliary terminals may include, for example, connections to a shunt trip mechanism or an undervoltage trip relay which trips the circuit breaker whenever the line voltage falls below a predetermined value.

An external auxiliary terminal block can be utilized to provide terminals for connection of the circuit breaker with such external trip mechanisms. Output auxiliary terminals may include, for example, connections to a bell alarm and other external circuits for enunciating or monitoring the open/closed/tripped status of the circuit breaker. An external auxiliary terminal block can also be utilized to provide terminals for interconnection of two circuit breaker status relay contacts having a common reference node with such external status monitoring circuits. Combinations of input and output auxiliary terminals may be provided by auxiliary terminal blocks having plural (e.g., six, nine, etc.) terminals. Circuit breakers having auxiliary terminal blocks are shown in U.S. Pat. Nos. 5,483,213 and 5,652,698.

When circuit breakers are mounted in cabinets or panelboards, the auxiliary terminal blocks shown in the above patents may not be readily accessible. There is a need, therefore, for a circuit breaker assembly having an auxiliary terminal block that improves the accessibility for connection to the internal wiring of the circuit breaker.

SUMMARY OF THE INVENTION

This and other needs are satisfied by the invention that is directed to a circuit breaker mounting assembly comprising an enclosure for holding at least one circuit breaker, with the circuit breaker being mounted within said enclosure; a terminal block mounted within the enclosure at a location remote from the circuit breaker, the terminal block including a plurality of input connections and a plurality of output connections; a plurality of control wires extending from the circuit breaker to the terminal block; and a mounting bracket for positioning the terminal block in a first position within the enclosure and for permitting the terminal block to be moved to a second location outside of the enclosure.

In the preferred embodiment, the first position is in a gutter area of the enclosure that houses electrical power conductors. Movement of the terminal block out of the gutter area permits easy access to the terminal block connection points and to the power conductors in the gutter area.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
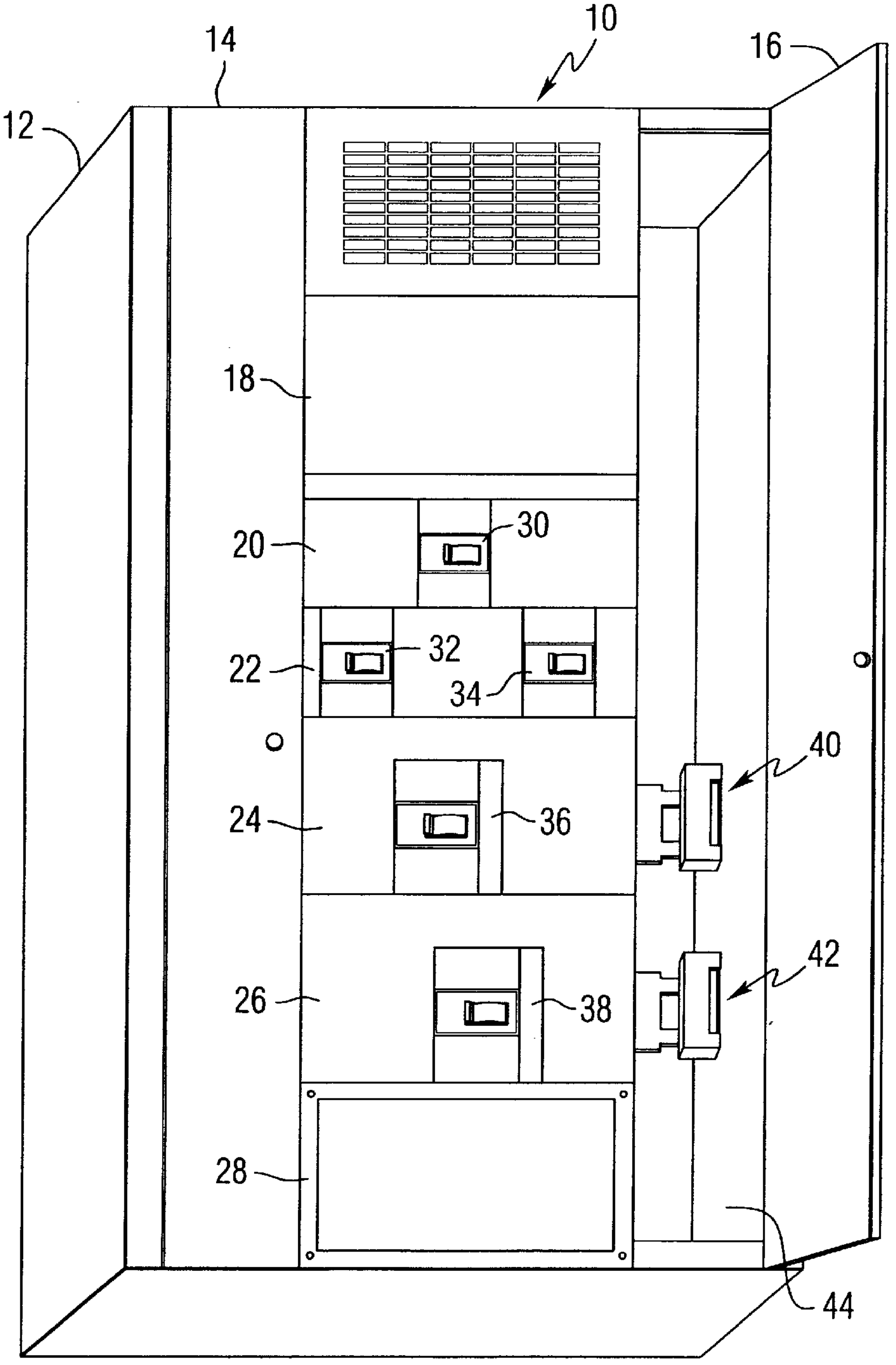
FIG. 1 is an isometric view of a circuit breaker mounting assembly having an auxiliary terminal block in accordance with the invention.

Referring to the drawings, FIG. 1 is an isometric view of a circuit breaker mounting assembly having an auxiliary terminal block in accordance with the invention. The circuit breaker mounting assembly 10 includes an enclosure 12, also referred to as a cabinet, that is capable of housing various electrical devices. The cabinet is constructed in accordance with the prior art, and in the illustrated embodiment includes a pair of doors 14 and 16 covering channels, also referred to as gutters, on either end of the cabinet. A plurality of front panels 18, 20, 22, 24, 26 and 28 extend between the channels. The panels include openings for exposing the faces of various electrical components that arc mounted in the cabinet. In this sample embodiment, five circuit breakers 30, 32, 34, 36 and 38 are shown to be mounted in the cabinet. A pair of terminal block assemblies 40 and 42 are shown to be mounted such that they extend into channel 44. The terminal block assemblies provide connection points for control circuitry in the circuit breakers as described below. While only two terminal block assemblies are shown in FIG. 1, it should be understood at more or less terminal blocks may be used in accordance with the invention.

Figure 2:
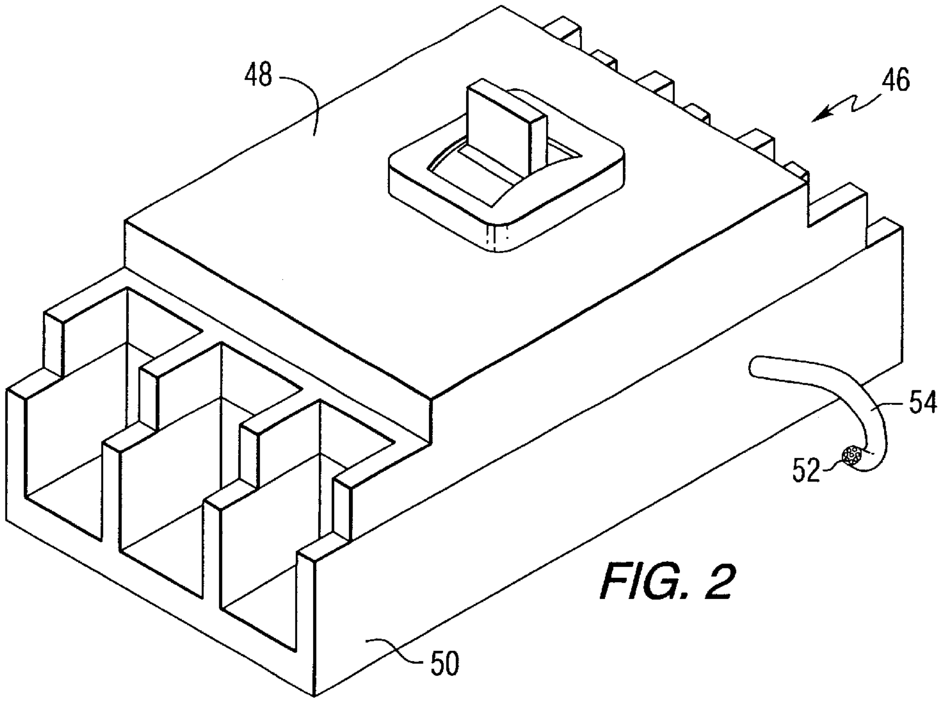
FIG. 2 is an isometric view of a circuit breaker that may by used in the assembly of FIG. 1.

FIG. 2 is an isometric view of a circuit breaker 46 that may by used in the assembly of FIG. 1. The circuit breaker 46 includes a molded cover 48 and a molded base 50. A plurality of control wires 52 emerge form an opening in the base and are contained within an insulting sleeve 54. The control wires are used in accordance with the prior art to monitor various parameters associated with the circuit breaker and to control the operation of the breaker. The individual control wires are coated with an insulating layer, but the voltage rating of the control wires is less than that required for exposed wire within the cabinet. Therefore, the control wires are contained within an outer sleeve 54 of insulation having a higher voltage rating. The control wires, within the sleeve pass within the cabinet to one of the remote terminal blocks, for example terminal block 40. In the preferred embodiment, the outer sleeve insulation is rated at 600 volts, while the insulation of the individual wires within the sleeve is rated at less than 600 volts.

Figure 3:
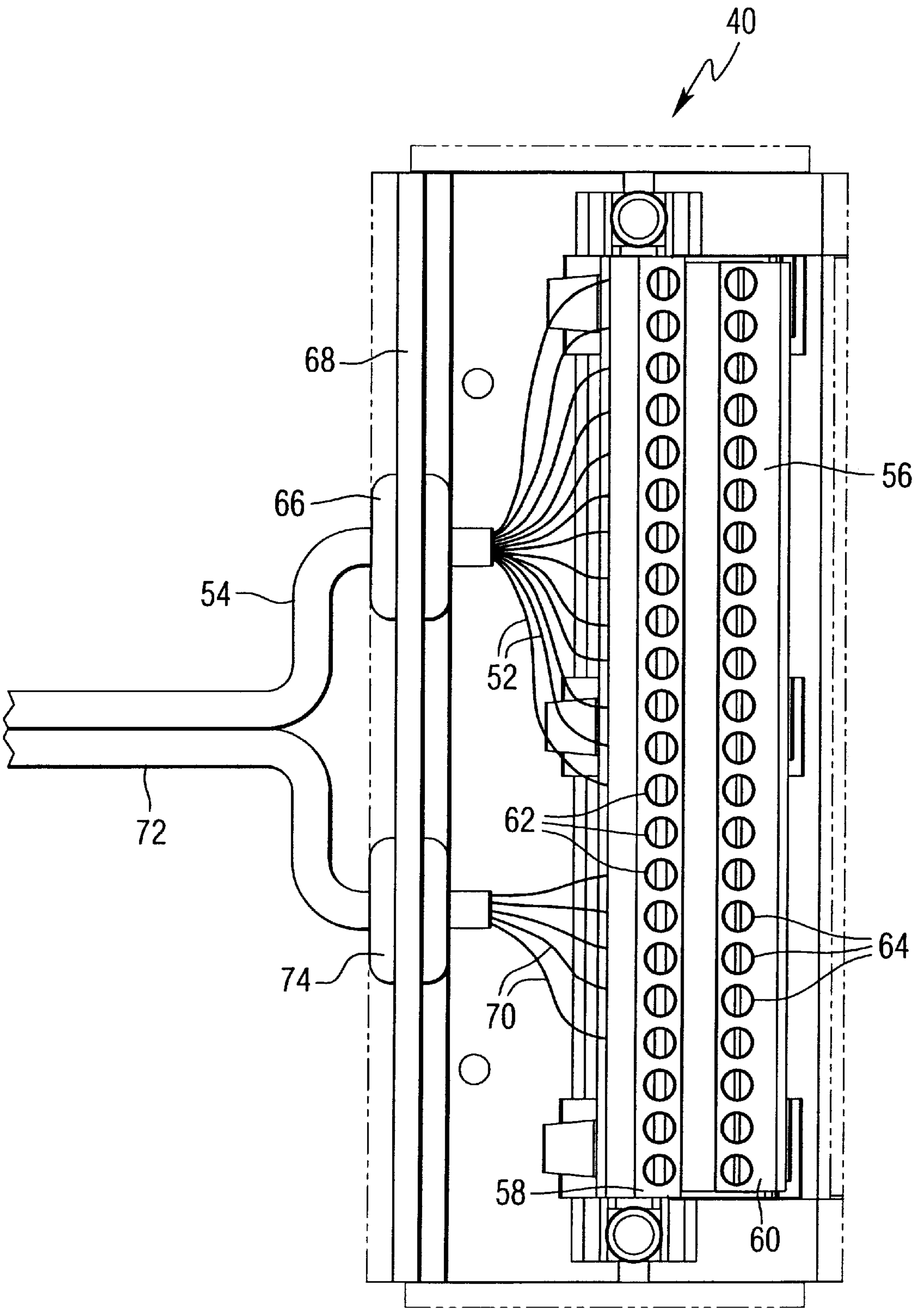
FIG. 3 is a top view of the terminal block of FIG. 3 with the cover shown in phantom lines.

FIG. 3 is a top view of the terminal block 40 with the cover shown in phantom lines. The terminal block 40 includes a terminal strip 56 having two offset rows 58 and 60 of connection points as generally indicated by item numbers 62 and 64. Control wires 52 are shown to be connected to connection points 62 in row 58. Insulating sleeve 54 passes through a grommet 66 in an opening in a plate 68 that forms a portion of an enclosure that houses row 58 of connection points of the terminal strip 56. In the illustrated embodiment, additional control wires 70 are also connected to connection points 62. These additional control wires are contained within insulating sleeve 72 that passes through another grommet 74 in another opening in plate 68. These additional control wires can be connected the same circuit breaker as control wires 52, or they can be connected to another circuit breaker or other device.

Figure 4:
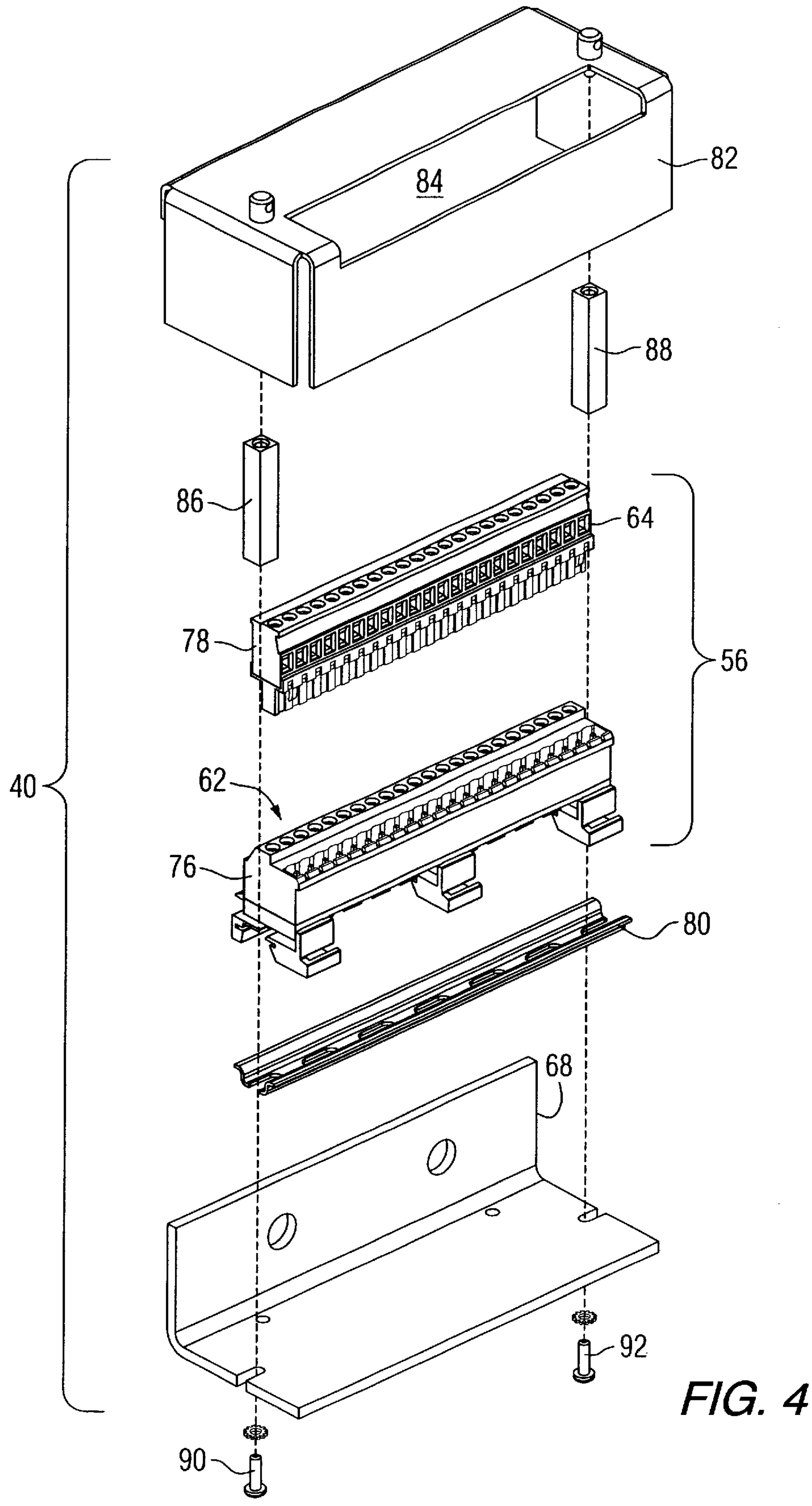
FIG. 4 is an exploded isometric view of a terminal block used in the assembly of FIG. 1.

FIG. 4 is an exploded isometric view of a terminal block used in the assembly of FIG. 1. In this figure, terminal strip 56 is shown to comprise two separable components 76 and 78 that contain the rows of terminals 62 and 64. A mounting bracket 80 is used to mount the terminal strip 56 to plate 68. A cover 82 having an opening 84 is attached to plate 68 by posts 86 and 88, and bolts 90 and 92 to form an enclosure that houses connection points 62. When the terminal block is assembled, connection points 64 extend through the opening 84 in the cover 82 such that connections can be made to connection points 64 without removing cover 82.

Figure 5:
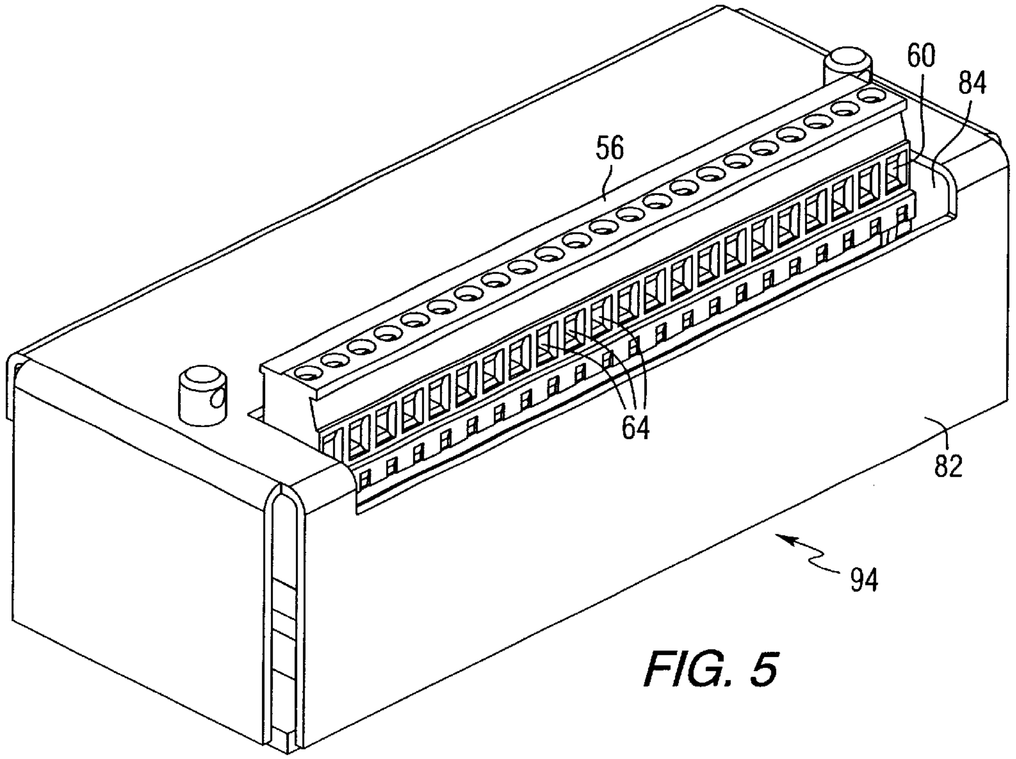
FIG. 5 is an isometric view of the terminal block of FIG. 3.

FIG. 5 is an isometric view of the terminal block of FIG. 3. This figure shows the terminal block with the cover 82 attached to the plate 68 so as to from an enclosure 94 that houses the lower row of connection points 62.

Figure 6:
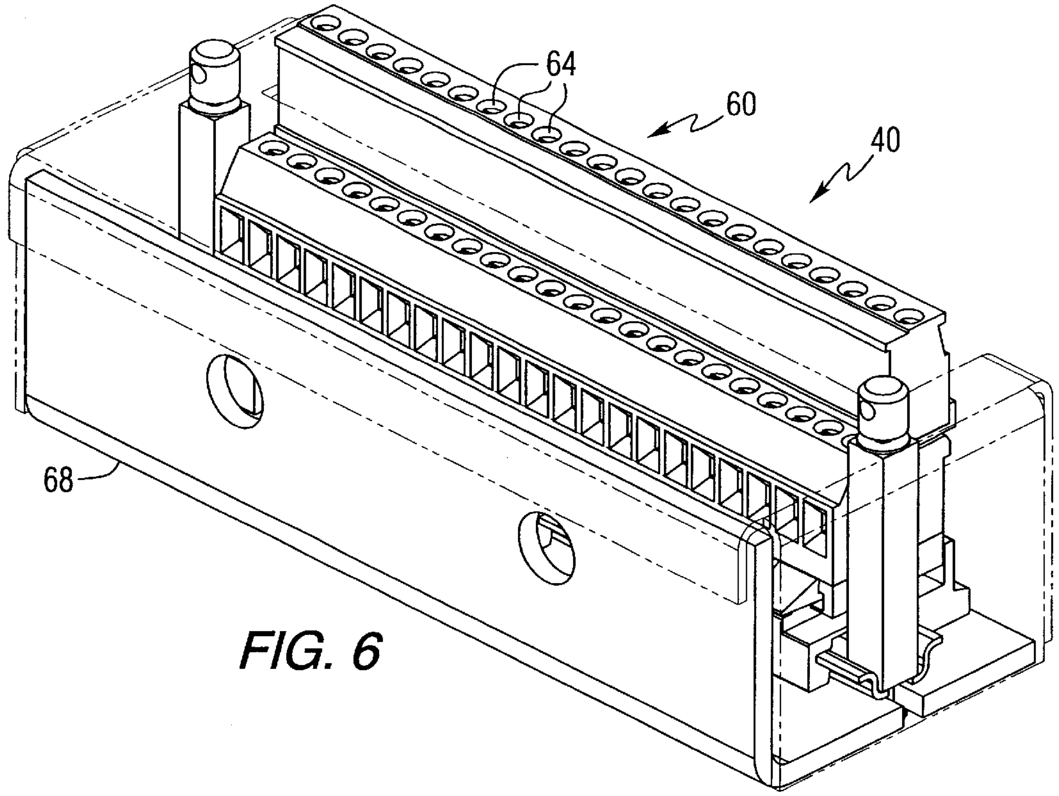
FIG. 6 is an isometric view of the terminal block of FIG. 3 with the cover shown in phantom lines.
Figure 7:
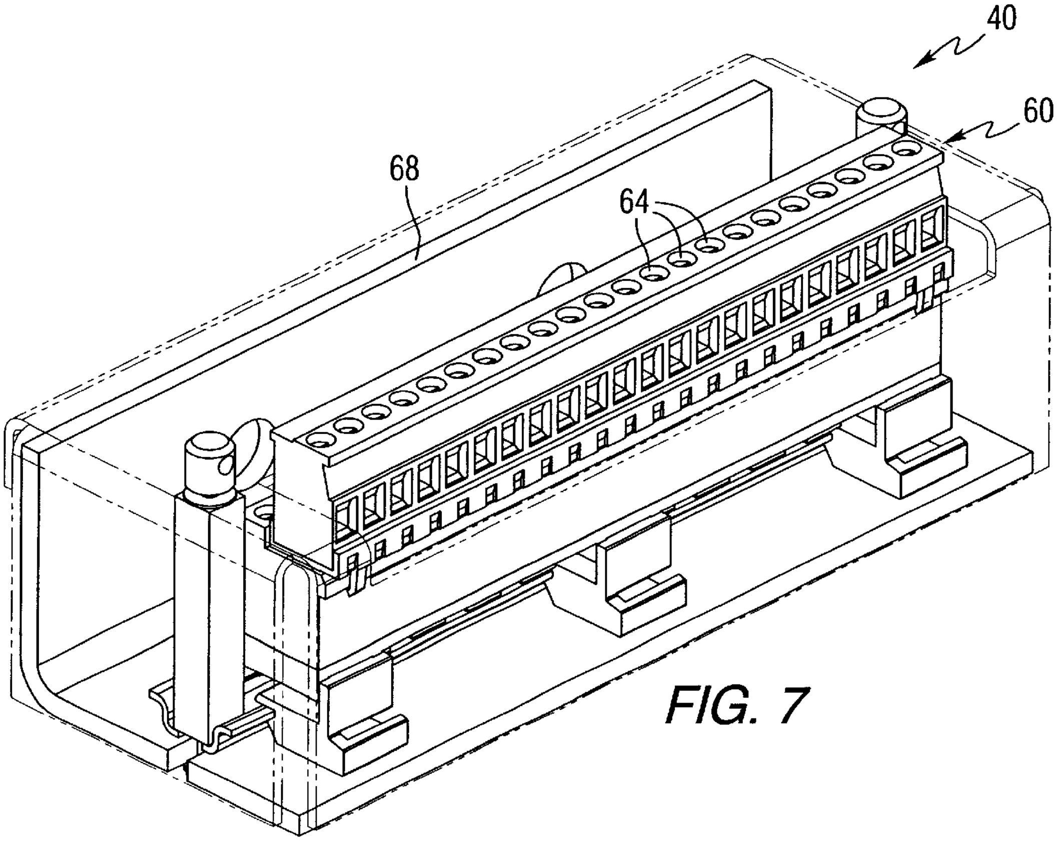
FIG. 7 is another isometric view of the terminal block of FIG. 3 with the cover shown in phantom lines.

FIG. 6 is an isometric view of the terminal block of FIG. 3 with the cover shown in phantom lines. FIG. 7 is another isometric view of the terminal block of FIG. 3 with the cover shown in phantom lines.

Figure 8:
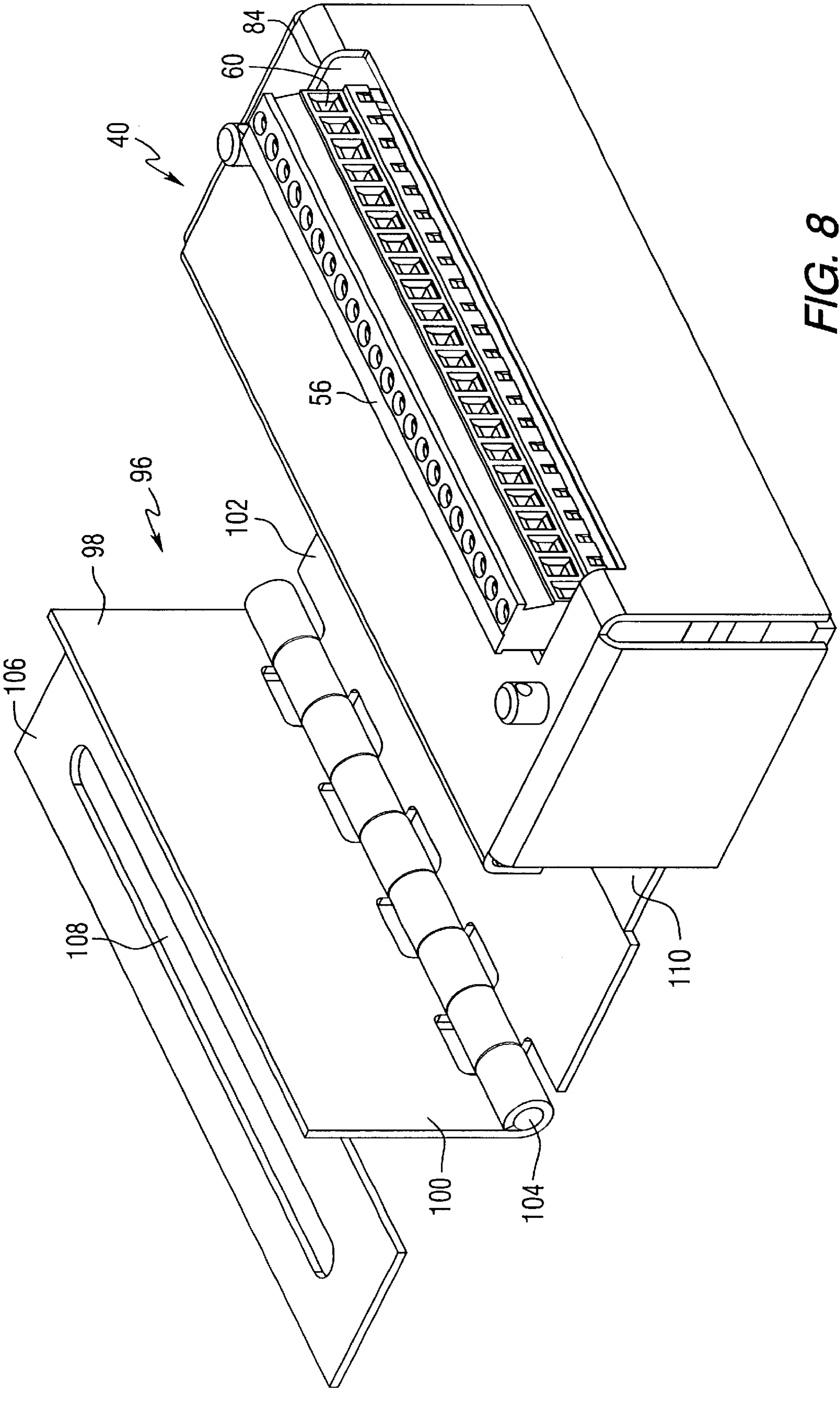
FIG. 8 is an isometric view of the terminal block of FIG. 3 attached to a hinged mounting bracket.

FIG. 8 is an isometric view of the terminal block of FIG. 3 attached to a hinged mounting bracket 96. The hinged mounting bracket includes a hinge member 98 having a pair of flanges 100 and 102 that pivot about pin 104. A plate 106 is connected to flange 100 and extends generally perpendicularly therefrom. The plate includes an elongated opening 108 that permits an adjustment in the vertical direction when the terminal block is mounted in the cabinet of FIG. 1. A pair of projections 110 and 112, shown in FIG. 9, extend from flange 102 for connection to the Terminal block.

Figure 9:
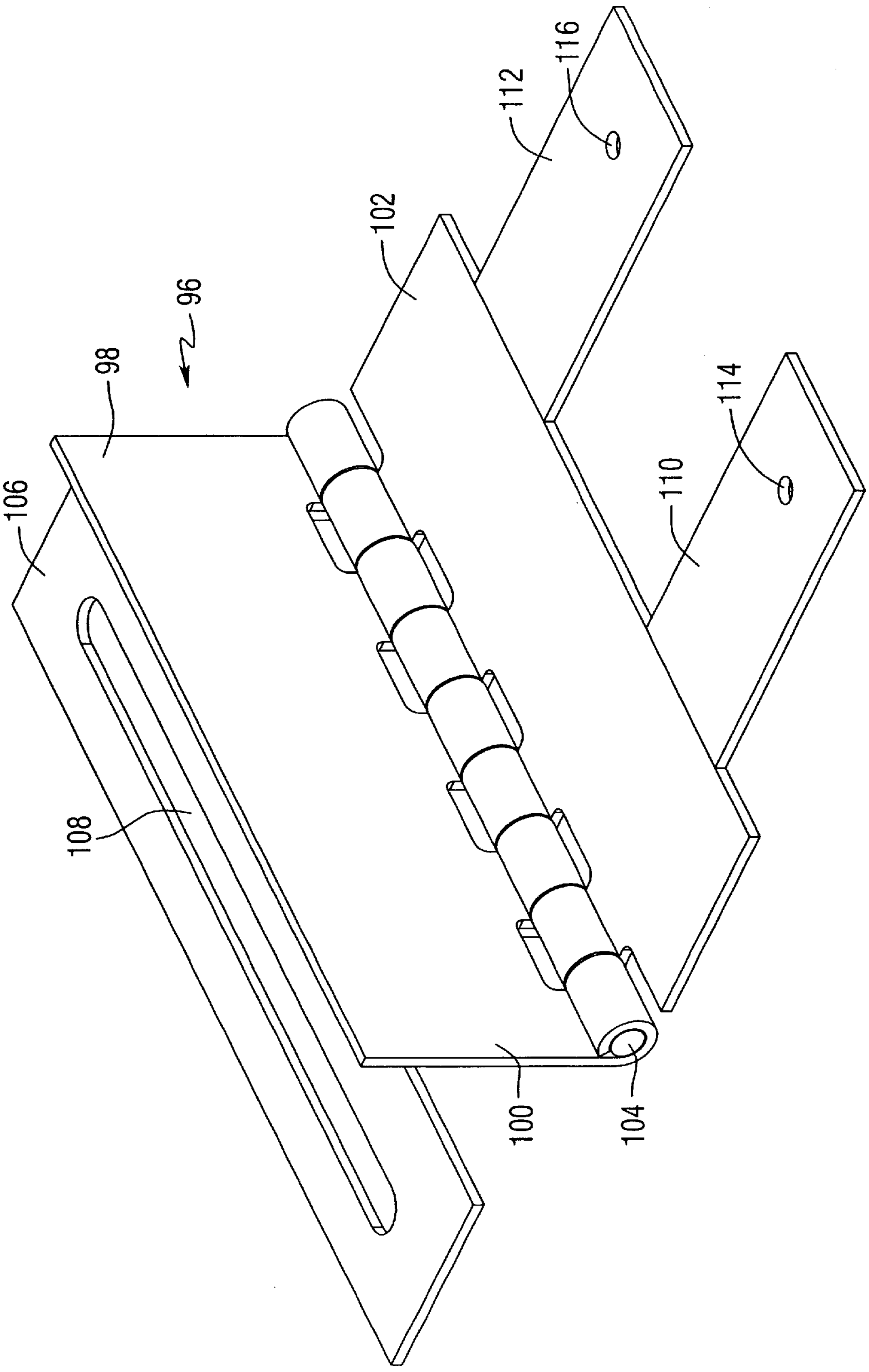
FIG. 9 is an isometric view of the hinged mounting bracket shown in FIG. 8.

FIG. 9 is an isometric view of the hinged mounting bracket shown in FIG. 8. Holes 114 and 116 are provided for receiving bolts 90 and 92 to couple the terminal block to the hinged mounting bracket. The distance between the holes and the pin 104 is large enough such that when flange 106 is attached to and internal surface of the cabinet of FIG. 1, the terminal block can swing out of the gutter area and in front of one of the cabinet panels. This provides improved access to the gutter area, as well as improved access to the connection points in the terminal block.

Figure 10:
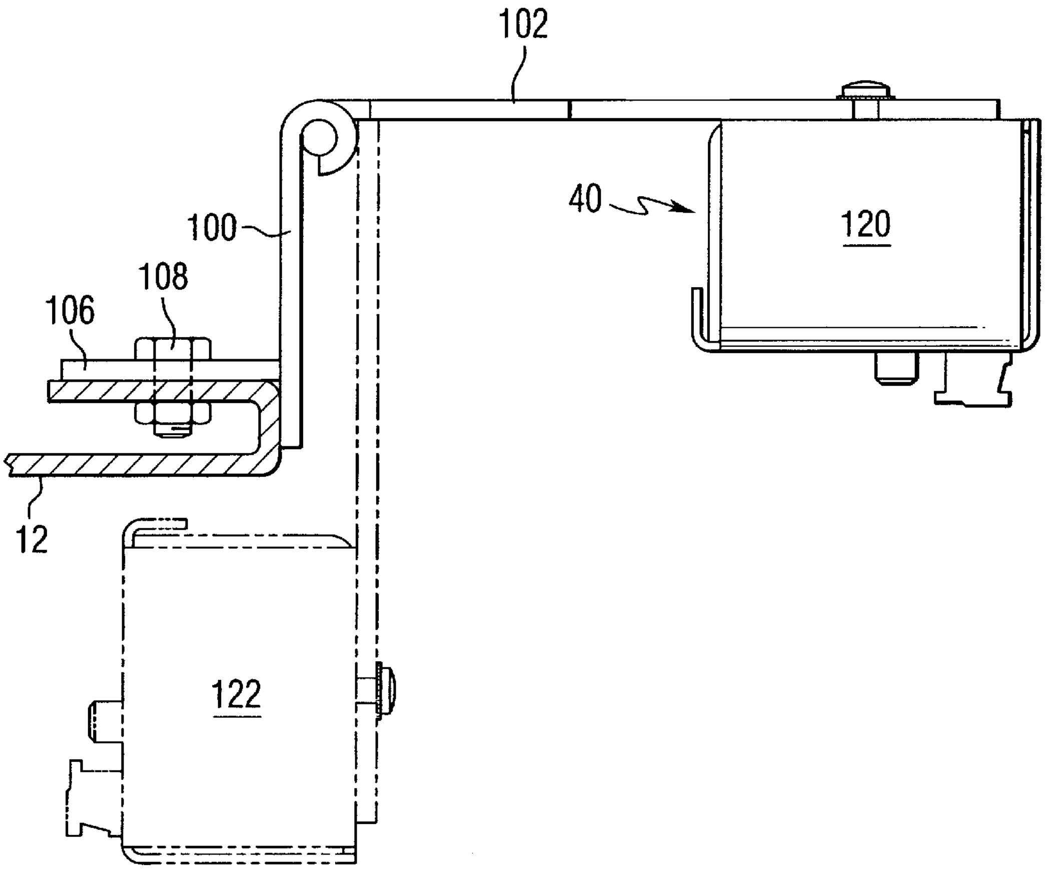
FIG. 10 is an end view of the terminal block mounted on the enclosure.

FIG. 10 shows how the terminal block can be mounted to the enclosure using one or more bolts 118 passing through the elongated slot in plate 106, and can move from a first position 120 within the gutter portion of the enclosure to a second position 122 outside of the enclosure. To be able to move the terminal block as shown in FIG. 10, the control wires, not shown in this view, that would be connected to the terminal block will have to have sufficient slack or flexibility to permit movement of the hinged mounting bracket.

This invention permits easy access to terminal block connection points as well as improved access to line terminal connections on the circuit breakers, which require occasional tightening checks. While specific embodiments of the invention have been described in detail, it will be appreciated by those skilled in the art that various modifications and alternatives to those details could be developed in light of the overall teachings of the disclosure. For example, while the preferred embodiment of the invention utilizes circuit breakers, it should be understood that the present invention is applicable to a wide variety of electrical devices which are considered to be equivalent where such devices are connected to the terminal block by auxiliary or control wires. Accordingly, the particular arrangements disclosed are meant to be illustrative only and not limiting as to the scope of the invention which is to be given the full breadth of the appended claims and any and all equivalents thereof.

What is claimed is:

1. A circuit breaker mounting assembly comprising:

an enclosure for holding at least one circuit breaker;

said circuit breaker being mounted within said enclosure;

a terminal block mounted within said enclosure at a location remote from said circuit breaker, said terminal block including a plurality of input connections and a plurality of output connections;

a plurality of control wires extending from said circuit breaker to said terminal block; and a mounting bracket for positioning said terminal block in a first position within said enclosure and for permitting said terminal block to be moved to a second location outside of said enclosure, the mounting bracket including a first flange, a second flange, a hinge coupling the first flange to the second flange, a plate connected to the first flange at a location spaced from an edge of the first flange and extending generally perpendicularly therefrom, the plate defining an opening for attachment to the enclosure.

2. A circuit breaker mounting assembly according to claim 1, wherein the opening comprises an elongated opening.

3. A circuit breaker mounting assembly according to claim 1, wherein said enclosure includes a gutter area and said first position is in the gutter area of said enclosure.

4. A circuit breaker mounting assembly according to claim 1, wherein a portion of said control wires between said circuit breaker and said terminal block is surrounded by an insulating tube.

5. A circuit breaker mounting assembly according to claim 4, wherein:

said control wires include insulation having a voltage rating less than required for exposed wiring in the enclosure; and said insulating tube has a voltage rating higher that the voltage rating of the control wires.

6. A circuit breaker mounting assembly according to claim 1, wherein the terminal block includes two offset rows of connection points and the circuit breaker mounting assembly further comprises:

a second enclosure housing a first one of the rows of connection points and having an opening through which a portion of the terminal block extends to expose a second one of the rows of connection points.

7. A circuit breaker mounting assembly according to claim 1, wherein:

the plate is fastened to an interior surface of the enclosure and a portion of the first flange is positioned adjacent to a portion of a wall of the enclosure.

* * * * *